INVENTOR.
ELMAN B. MYERS
BY
ATTORNEYS

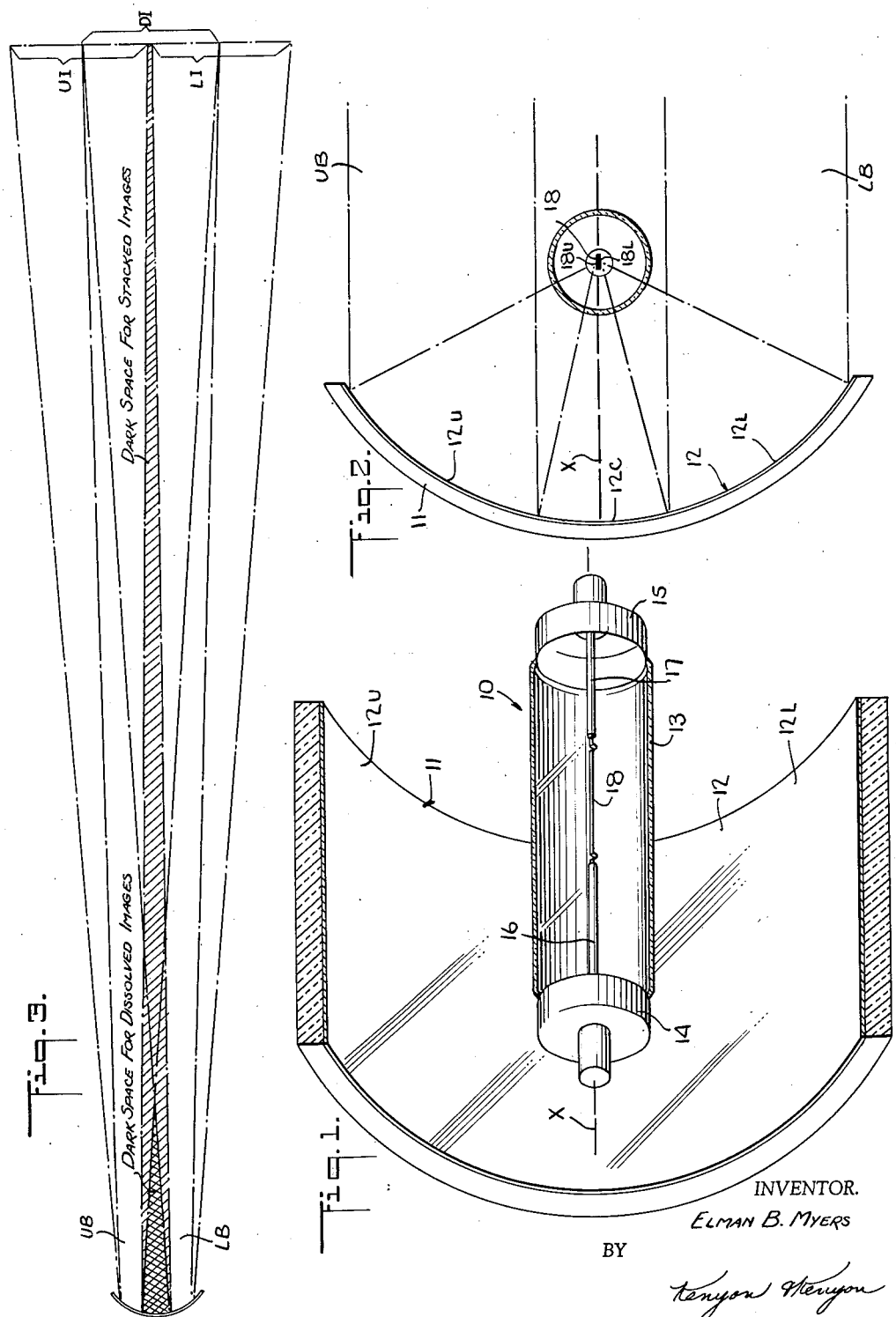

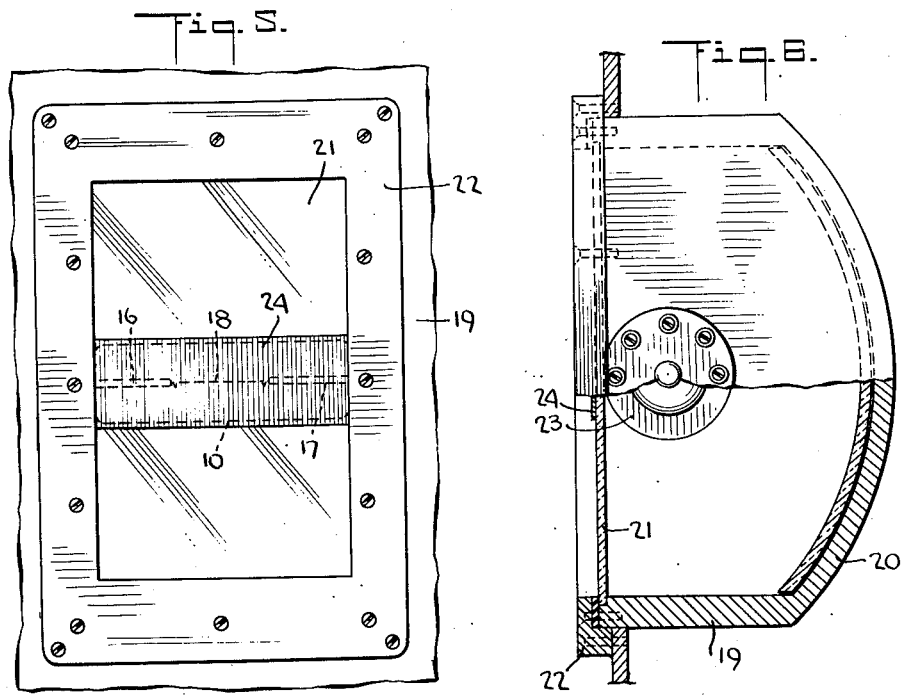
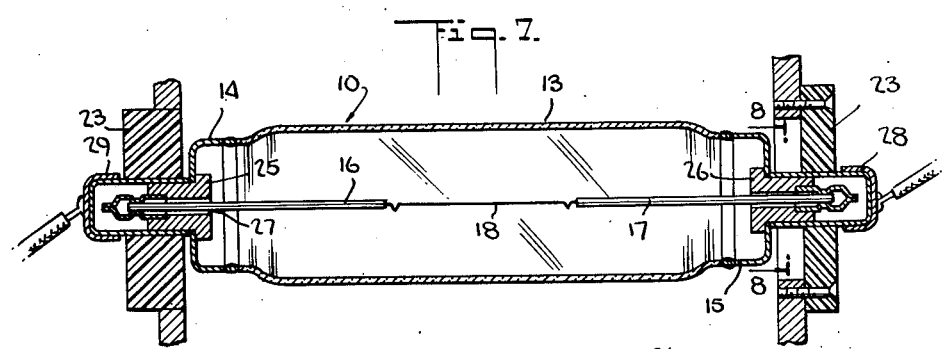
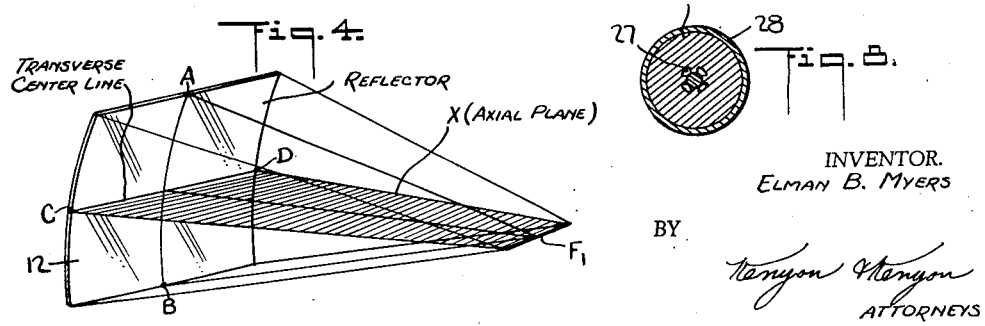
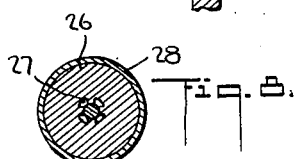
INVENTOR.
ELMAN B. MYERS

United States Patent Office 3,037,139
Patented May 29, 1962

3,037,139
DOUBLE IMAGE ELECTRIC LIGHT PROJECTORS
Elman B. Myers, Pompton Lakes, N.J., assignor to Fuller-Myers, Spokane, Wash., a partnership
Filed Dec. 5, 1958, Ser. No. 778,359
11 Claims. (Cl. 313—113)

The present invention relates generally to electric light projectors and more particularly to vehicular headlights adapted to project rectilinear double images of high brilliance and uniform intensity.

The principal change in automotive lighting in recent years has been the adoption of the so-called "sealed-beam" headlamp which has rendered obsolete virtually all other types of lamps for road illumination. The sealed-beam unit is designed for both upper and lower beam operation. The country or upper beam acts to provide a clear road beam for distant illumination to be used on open highway when not meeting other vehicles. The traffic or lower beam is intended to produce a beam which is low enough on the left to avoid glare in the eyes of oncoming drivers, this beam being designed for use in congested areas and on highways when meeting other vehicles within a short distance.

It is now recognized that glare or blinding effects from headlights is a major cause of traffic accidents and fatalities on the highway. The sealed-beam unit is responsible for such glare, for while it is possible to switch from high to low beam to minimize glare, this is done at the expense of effective road lighting. Consequently many drivers fail to switch over beams in the interest of safety, for the driver is concerned primarily with his own visibility and is often inconsiderate of the oncoming driver.

The measurement and appraisal of glare have long defied numerical evaluation since glare involves many elements such as size and brightness of the source, angle of view and the overall psychological reaction. When a point source of light is used with a reflector, the resultant reflector flash produces dazzling rays when viewed by the observer.

The sealed-beam headlight is essentially no different from other types of light projectors and comprises a generally conical reflector in which is mounted a point light source constituted by a small incandescent filament in coiled form. Inherently such device behaves as concentrated spot lights, and give rise to glare effects which can be minimized only by sacrificing light intensity and scope of illumination.

Conventional light projectors exhibit many forms of optical aberration, such as chromatism, coma, astigmatism, image curvature and distortion of the projected field. In addition to their optical defects, projectors of standard design are of low efficiency, for merely a fraction of the light generated by the filament is effectively projected. The reason for this lies in the nature of the coiled filament relative to the configuration of the reflector. Only a portion of the rays emanating the coiled incandescent body of the filament is collected and projected by the reflector. In point of fact only about 5% of the total light from the source reaches the target.

In view of the foregoing, it is the principal object of this invention to provide a light projector of exceptionally high efficiency which is free of optical aberration and acts to provide an undistorted field of high brilliancy.

Another object of the invention is to provide a light projector of high power which is free of glare and which produces an illuminated field having relatively uniform luminosity. A light projector in accordance with the invention is adapted to act as a non-glare headlight in automotive applications, or as a landing light for aircraft.

A significant feature of the invention resides in the fact that the projected light encompasses a wide horizontal area within sharply defined vertical limits whereby in road or runway lighting the full width of the road or runway is brilliantly illuminated to provide a virtual carpet of light. The light projector is also useful as a marker light for airfields or as a searchlight or signal light in marine and in many military applications.

Still another object of the invention is to provide an improved light projector which uniformly illuminates a sharply defined field, all rays being confined within the intended parameters, thereby obviating loss of light energy outside the desired limits.

Briefly stated, these objects are attained in a light projector structure constituted by a reflector in the form of a segment of a cylinder acting in conjunction with an elongated incandescent ribbon filament lying within the normal optical axis of the cylindrical reflector in parallel relation to the surface thereof, such that light rays emanating from the upper face of the filament are collected and projected from the upper section of the reflector and light rays emanating from the lower face are projected from the lower section thereof. The two distinct beams thus produced result in illuminated rectangular images with substantially uniform illumination over the entire field, the light cutting off abruptly outside of the boundaries. The two images may be juxtaposed in edge to edge relation or dissolved in a superposed pattern of double intensity.

For a better understanding of the invention as well as other objects thereof, reference is made to the following detailed description to be read in conjunction with the accompanying drawings, wherein like components in the several figures are identified by like reference numerals.

In the drawings:

FIG. 1 is a perspective view of the main components of a light projector in accordance with the invention.

FIG. 2 is a side view of the projector shown in FIG. 1.

FIG. 3 is a diagram illustrating the light pattern of the projector as seen in the vertical plane.

FIG. 4 illustrates the optical characteristics of a cylindrical reflecting surface.

FIG. 5 is a front view of the encased light projector.

FIG. 6 is a side view of the projector shown in FIG. 5.

FIG. 7 is a sectional view of the ribbon filament lamp incorporated in the light projector.

FIG. 8 is a transverse section taken through the plane of line 8—8 in FIG. 7.

Figure 9:
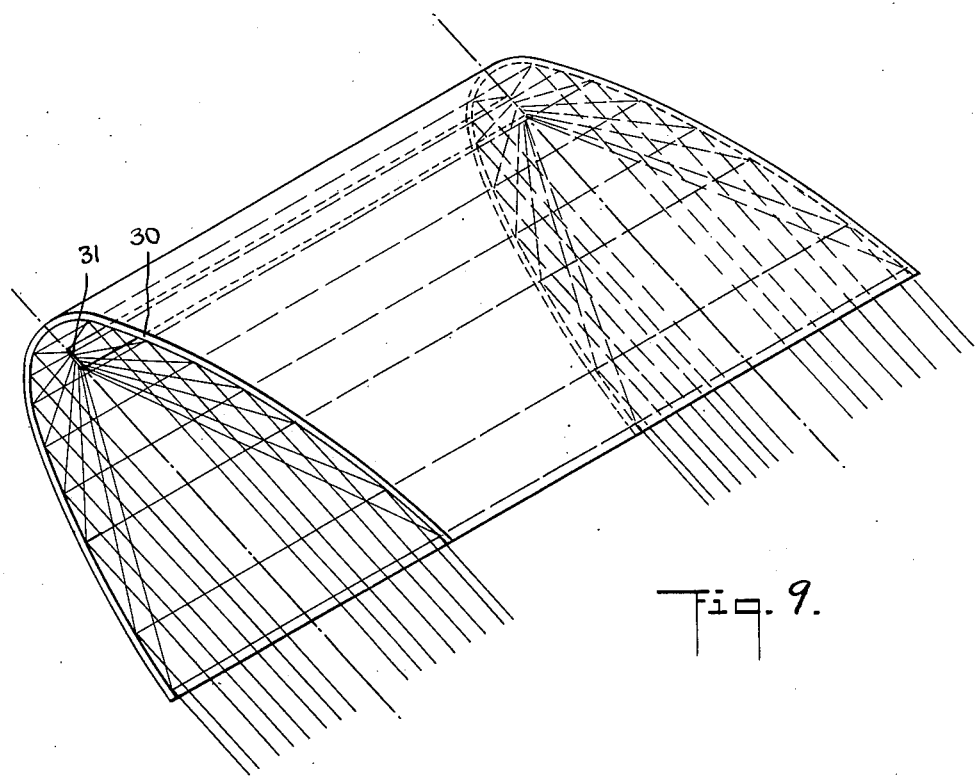
FIG. 9 is a perspective view of another preferred embodiment of light projector in accordance with the invention.
Figure 10:
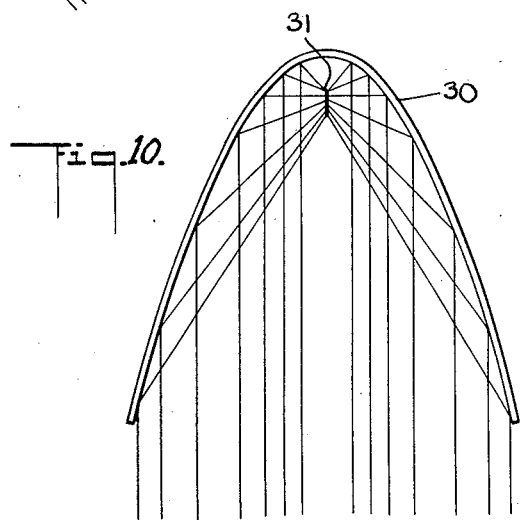
FIG. 10 shows the projection pattern of the projector of FIG. 9.

Referring now to FIG. 1, the main components of the light projector are an incandescent lamp, generally designated by numeral 10 and a reflector 11. While the structure is shown as constituted by a self-sufficient and replaceable lamp, it is to be understood that a sealed-beam unit construction may be used.

Reflector 11 is constituted by a segment of a cylindrical surface which may be circular, parabolic, hyperbolic or any other optical curve, as long as it is a partial cylindrical surface. A cylindrical surface is one generated by the movement of a straight line (the generatrix) which constantly is parallel to a fixed straight line and touches a fixed curve (the directrix) not in the plane of the fixed straight line. The reflector shown in FIG. 1 is based on a circular curve, the normal axial plane of the reflector, indicated by dashed line X extending through the transverse center line of the reflector surface.

In practice, the reflector 11 may be formed by cutting a segment from a tubular glass cylinder of circular cross-section. The inside surface 12 of the reflector is aluminized by the vacuum evaporation technique or any other means. Coated over the metalized surface is a layer of transparent silicon monoxide about one-half of a wavelength in depth to provide a protected surface of high reflectivity.

The reflector may also be made on a plastic base or by stretch-wrap forming a metallic sheet over a properly contoured die in a metal forming machine. The latter technique is particularly suitable for the more difficult optical forms such as the parabolic cylindrical reflector.

Incandescent lamp 10 is constituted by a tubular glass envelope 13 enclosed by conductive end caps 14 and 15 from which inwardly project filament support rods 16 and 17 in axial alignment. Spanning the rods and secured thereto is an elongated thin ribbon or sheet filament 18 having planar faces. The lamp is so supported relative to the reflector whereby the plane of the filament lies within the axial plane of the reflector, the filament being in parallel relations to the reflective surface and being symmetrically disposed with respect to the surface.

Let us now consider the reflecting properties of the cylindrical segment 12, as shown in FIG. 4. It will be seen that all lines parallel to the central curve A—B in the vertical plane have the same curvature, and that all lines parallel to the central rectilinear line C—D in the horizontal plane are straight. This will produce a cylindrical wave which comes to a linear focus at $F_1$ in the axial plane X which extends through the transverse center line of the reflector. The length of the line $F_1$ is equal to the length of the cylindrical wave.

Referring now to FIG. 2, it will be seen that filament 18 lies within the normal axial plane X in parallel relation to the reflector surface 12, the entire surface of the filament being incandescent. The upper face 18u of the filament generates light rays which are cast on the upper section 12u of the reflector and are reflected therefrom to produce a forwardly directed upper beam UB. The lower face 18L of the filament generates light rays which are cast on the lower section 12L of the reflector to produce a separate and forwardly directed lower beam LB.

The small amount of light emanating from the narrow edges of the filament is not significant and may be disregarded, particularly when the filament is very thin in its preferred form. Hence the central section 12C of the reflector constitutes a dark space and the fact that it is somewhat blocked by the presence of the lamp is not important and results in no material loss of light.

From the foregoing, it will be appreciated that bi-axial optical coupling exists between the flat filament and the single reflector, substantially all rays from both faces of the filament being projected and optical interference of the lamp itself being effectively eliminated. Thus a bi-optical system is developed from a single incandescent source and a single reflector.

As shown in FIG. 3, the two beams UB and LB are forwardly projected in space to provide a double image, the images UI and LI being stacked one above the other in edge to edge relation, thereby doubling the height of the projected pattern. By shifting the distance between the ribbon filament and the reflector in the axial plane X while maintaining the parallel relationship therebetween the two images may be caused to overlap and to be fully dissolved in each other or superimposed, thereby producing an illumination field DI of double intensity.

It will be observed that there is parallel focusing of all points along the filament. The degree of azimuthal spread or light fanning is determined by the overall length of the filament relative to the length of the reflector. For a relatively short filament, the angle of incidence between the extremities of the ends of the reflector is greater than where the ratio of filament to reflector length is small, thereby increasing the angle of reflection in the horizontal direction and causing an enhanced spread.

Referring now to FIGS. 5 and 6, the light projector is shown incorporated in a headlight assembly comprising a housing in the form of a rectangular shell 19, preferably formed of aluminum, having a curved rear wall 20 conforming to the curvature of reflector 11 mounted thereagainst. The front wall of the housing is formed by a glass window 21 secured to the housing shell by means of a rectangular frame member 22 also of aluminum. The lamp 10 is mounted between insulating bushings 23 of Teflon or other suitable material attached to the side walls of the housing such that the plane of the ribbon filament 18 lies in the axial plane of the reflector and the filament is disposed in parallel relation to the reflector.

Since the central area of the lamp constitutes a dark space, an opaque strip 24 may be placed across the lamp window to block out all direct radiation entirely. Thus whatever light is seen by an observer looking into the lamp assembly is the distributed light radiating from the surface of the reflector, such light being derived from an area source rather than the usual point source. Glare effects are thereby avoided and at the same time, since substantially all light generated by the filament is bi-optically radiated, the light efficiency is of a high order. Mechanical control means may be provided in connection with the bulb mounting to shift the focal position of the bulb in the axial plane of the reflector.

It will be noted that the headlight assembly has a rectangular cross-section, and the two beams emanating from the assembly each have a rectangular cross-sectional area. It now becomes possible to effect major design changes in the appearance of a motor vehicle which have heretofore carried round bulbous headlights, whatever the design. Headlights designed in accordance with the invention may be concealed behind the front grill of the vehicle, with narrow slits formed in the grill to permit passage of the beams. The upper beam may be used for the illumination of upstanding objects in the target area with zero glare, and the lower beam to afford road illumination, both beams providing complete horizontal coverage.

Conventional headlamp projection systems are based on small tungsten coils with an interrupted area and point source conditions of high wattage consumption with resultant spot lighting and broad light diffusion accompanied by reflector glare. The invention disclosed herein is based on large double incandescent areas with relatively low wattage consumption and a uniform field of illumination, substantially free of glare and spot effects. Another valuable characteristic of the invention is that it produces a complete uninterrupted pattern of white light commensurate with the color temperature of the source and free of chromatic aberration.

Since two independent beams are produced by the light projector, various color combinations may be obtained additively by the use of a filter of one color in conjunction with one of the beams and a differently colored filter for the other beam, the two colored beams being combined to produce a third color in accordance with well known color mixing principles. This feature is particularly useful in stage lighting.

FIG. 7 shows a preferred form of the lamp bulb 10, the tubular glass envelope 13 being of the pyrex type, and having its ends glass-to-metal sealed to Kovar metal caps 14 and 15. The filament support rods are of molybdenum and are supported within stainless steel plugs 25 and 26, mounted concentrically within caps 14 and 15 and projecting outwardly therefrom. The plugs are provided with holes 27 through which the envelope may be exhausted. Received over the plugs are tubular terminals 28 and 29 to which the current leads for the lamp are soldered.

Referring now to FIGS. 8 and 9, there is illustrated another form of light projector in accordance with the invention, only the reflector surface 30 and the incandescent ribbon filament 31 being shown. In this case, the segment of a cylindrical surface is based on a parabolic curve, in which curve the distance of any point on it from a fixed line (the directrix) is equal to its distance from a fixed point (the focus).

In contradistinction to the well known paraboloidal reflectors in which rays from a point source are projected to form a single image, the present invention combines a reflecting surface formed of a segment of a parabolic cylinder with a ribbon filament which is disposed in parallel relation to the reflector within the axial plane thereof whereby each incandescent face of the filament is projected by a respective section of the reflector to produce two like beams which may be stacked or dissolved.

The inner surface of the reflector is aluminized and the sheet filament may be of tungsten or any other suitable material. Preferably the filament is no greater than .001 inch thick to provide a minimum of luminous energy in the edge direction. The filament acts as a bi-luminous emitter, each face providing a distinct beam of like intensity. By shifting the focal distance between the filament and the reflector within the axial plane, a selection of patterns is obtainable. Thus two images may be obtained separated by a dark space, two images may be produced or juxtaposed in edge-to-edge relation or the two images may be dissolved into a single image of double intensity.

While there has been shown what are considered to be preferred embodiments of the invention, it is to be understood that many changes may be made without departing from the essential spirit of the invention. For example, in radar applications in place of a ribbon filament, the energy source may be constituted by a dual-dipole arrangement or a dual wave guide horn adapted to project radiant energy in opposing directions normal to the axial plane of the cylindrical reflector to produce radar beams having the characteristics and the range of pattern selection described herein in connection with light beams. Vertical scanning effects of large sweep magnitude may also be obtained by the simple expediency of a mechanical variation in the focal position of the dual energy source.

It is intended therefore in the annexed claims to cover all such changes and modifications as fall within the true spirit of the invention.

What is claimed is:

1. A glare-free light projector comprising a reflector constituted by a segment of a cylindrical surface said reflector having an axial plane passing through the transverse center line of the surface, and an incandescent planar ribbon filament disposed in said axial plane symmetrically and in parallel relation to said reflector, the opposing flat faces of said filament lying parallel to said axial plane and generating light rays which are cast on respective sections of said reflector on either side of said transverse line and are reflected thereby to produce two like beams, the remaining central section of said reflector constituting a dark space.

2. A glare-free light projector comprising a reflector constituted by a segment of a cylindrical surface and having a parabolic curvature, said reflector having an axial plane passing through the transverse center line of the surface, and an incandescent planar ribbon filament disposed in said axial plane symmetrically and in parallel relation to said reflector, the opposing flat faces of said filament lying parallel to said axial plane and generating light rays which are cast on respective sections of said cylindrical parabolic reflector on either side of said transverse line and are reflected thereby to produce two like beams constituted by parallel rays.

3. A bi-optical light projector comprising a reflector constituted by a segment of a cylindrical surface, said reflector having an axial plane passing through the transverse center line of the surface, and an incandescent ribbon filament disposed in said axial plane in parallel relation to said reflector, the opposing flat faces of said filament lying parallel to said axial plane and generating light rays which are cast on respective sections of said reflector on either side of said transverse line and are reflected thereby to produce two like beams, said filament being focally spaced from said reflector at a distance at which said two beams produce an illuminated field constituted by stacked images in edge to edge relation.

4. A bi-optical light projector comprising a reflector constituted by a segment of a cylindrical surface, said reflector having an axial plane passing through the transverse center line of the surface, and an incandescent ribbon filament disposed in said axial plane in parallel relation to said reflector, the opposing flat faces of said filament lying parallel to said axial plane and generating light rays which are cast on respective sections of said reflector on either side of said transverse line and are reflected thereby to produce two like beams, said filament being focally spaced from said reflector at a distance at which said two beams overlap to produce an illuminated field having double intensity.

5. A projector, as set forth in claim 1, further including two differently colored filters operatively coupled to the sectors of the reflector to produce beams having different colors.

6. A projector, as set forth in claim 5, wherein said filament is so spaced from said reflector to cause said beams to overlap to produce a third color resulting from the additive mixing of said two colors.

7. A glare-free light projector comprising a reflector constituted by a segment of a cylindrical surface, said reflector having an axial plane passing through the transverse center line of the surface, an incandescent thin planar ribbon filament disposed in said axial plane in parallel relation to said reflector, the opposing flat faces of said filament lying parallel to said axial plane and generating light rays which are cast on respective sections of said reflector on either side of said transverse line and are reflected thereby to produce two like beams, the remaining central section of the reflector constituting a dark space, and a shield covering the side of said filament facing away from said reflector and in registration with said dark space.

8. A headlight assembly comprising a rectangular housing shell, a reflector disposed at the rear of said shell and constituted by a segment of a cylindrical surface, said reflector having an axial plane passing through the transverse center line of the reflecting surface, an electric bulb mounted between the said walls of said shell and having an incandescent planar ribbon filament disposed in said axial plane in parallel relation to said reflector, the opposing flat faces of said filament lying parallel to said axial plane and generating light rays which are cast on respective sections of said reflector on either side of said transverse line and are reflected thereby to produce two like beams, and a transparent window covering the front of said shell.

9. A glare-free headlight assembly comprising a rectangular housing shell having a rear wall, a reflector disposed against the rear wall of said shell and constituted by a segment of a cylindrical surface, said reflector having an axial plane extending through the transverse center line of the reflecting surface, a replaceable electric bulb mounted between the side walls of said shell and having an incandescent planar ribbon filament disposed in said axial plane in parallel relation to said reflector, the opposing flat faces of said filament lying parallel to said axial plane and generating light rays which are cast on respective sections of said reflector on either side of said transverse line and are reflected thereby to produce two like beams, a transparent window covering the front of said shell, and a transverse shield strip across said window to block front radiation from said hub.

10. An assembly as set forth in claim 9, wherein said reflector surface has a circular curvature.

11. An assembly as set forth in claim 9, wherein said reflector surface has a parabolic curvature.

References Cited in the file of this patent

UNITED STATES PATENTS

| | | |
|---|---|---|
| 254,032 | Maxim | Feb. 21, 1882 |
| 330,586 | Heisler | Nov. 17, 1885 |
| 1,206,333 | Keyes | Nov. 28, 1916 |
| 1,863,152 | Barkey | June 14, 1932 |
| 1,936,854 | Parker | Nov. 28, 1933 |
| 2,561,033 | Odds | July 17, 1951 |
| 2,666,158 | Cooper | Jan. 12, 1954 |
| 2,848,639 | Urban | Aug. 19, 1958 |